United States Patent
Frank et al.

(10) Patent No.: US 7,322,046 B2
(45) Date of Patent: Jan. 22, 2008

(54) METHOD AND SYSTEM FOR THE SECURE USE OF A NETWORK SERVICE

(75) Inventors: Michael Frank, Munich (DE); Ralf Rieken, Reston, VA (US)

(73) Assignee: Siemens Aktiengesellschaft, Munich (DE)

( * ) Notice: Subject to any disclaimer, the term of this patent is extended or adjusted under 35 U.S.C. 154(b) by 986 days.

(21) Appl. No.: 09/877,874

(22) Filed: Jun. 8, 2001

(65) Prior Publication Data

US 2002/0049807 A1 Apr. 25, 2002

(30) Foreign Application Priority Data

Jun. 8, 2000 (DE) ............................... 100 28 371

(51) Int. Cl.
- G06F 7/04 (2006.01)
- G06F 17/30 (2006.01)
- H04K 1/00 (2006.01)
- H04L 9/00 (2006.01)
- H04L 9/32 (2006.01)
- G06F 15/16 (2006.01)
- G06F 11/30 (2006.01)

(52) U.S. Cl. ........................... 726/27; 726/4; 713/170; 713/185; 713/187

(58) Field of Classification Search ................ 709/203, 709/243, 245, 217, 250, 225, 229; 713/201, 713/155, 170, 185, 187; 705/59; 370/254, 370/409; 726/4, 27

See application file for complete search history.

(56) References Cited

U.S. PATENT DOCUMENTS

| 5,457,798 | A | * | 10/1995 | Alfredsson | 719/321 |
|---|---|---|---|---|---|
| 5,812,533 | A | * | 9/1998 | Cox et al. | 370/259 |
| 5,974,549 | A | * | 10/1999 | Golan | 713/200 |
| 6,134,603 | A | * | 10/2000 | Jones et al. | 719/300 |
| 6,138,238 | A | * | 10/2000 | Scheifler et al. | 713/200 |
| 6,185,611 | B1 | * | 2/2001 | Waldo et al. | 709/221 |
| 6,708,171 | B1 | * | 3/2004 | Waldo et al. | 707/10 |
| 6,832,223 | B1 | * | 12/2004 | Scheifler et al. | 707/10 |
| 6,845,393 | B1 | * | 1/2005 | Murphy et al. | 709/220 |
| 6,877,094 | B1 | * | 4/2005 | DiGiorgio et al. | 713/176 |
| 2001/0002473 | A1 | * | 5/2001 | Waldo et al. | 709/229 |
| 2002/0133573 | A1 | * | 9/2002 | Matsuda et al. | 709/220 |

OTHER PUBLICATIONS

Andersson, Fredrik et al. "Secure Jini Services in Ad Hoc Networks", Feb. 2000.*
Cap, Celemens H. et al. "Overview of Spontaneous Networking—Evolving Concepts and Technologies".*
Crichton, Charles et al. "When to trust mobile objects: access control in the Jini Software System", Aug. 1999.*

(Continued)

*Primary Examiner*—Kambiz Zand
*Assistant Examiner*—Michael J. Simitoski
(74) *Attorney, Agent, or Firm*—Bell, Boyd & Lloyd LLP

(57) ABSTRACT

In a network, in particular an ad-hoc network AHN, having a blackboard on which all the usable services are entered, following detection of a service which has not yet been entered on the blackboard, a check is carried out to determine whether use of the service is admissible. The service is entered onto the blackboard only if use of the service is admissible. This provides centrally administrable secure use of services in plug & play networks.

7 Claims, 1 Drawing Sheet

OTHER PUBLICATIONS

Czerwinski, Steven E. et al. "An Architecture for a Secure Service Discovery Service", 1999 ACM.*

Richter, Jeffrey. "Manipulate Windows NT Services by Writing a Service Control Program", Feb. 1998, <http://www.microsoft.com/msj/0298/service.aspx>.*

Williams, Jeff. "Jini and Mobile Agent Security", Agent Technology '98.*

De Nicola, Rocco et al. "Coordinating Mobile Agents via Blackboards and Access Rights", LNCS 1997.*

Eronen, Pasi et al. "Extending Jini with Decentralized Trust Management", Mar. 2000.*

Hasselmeyer, Peer. "Jini Security", Nov. 1999.*

Hasselmeyer, Peer et al. "Trade-offs in a Secure Jini Service Architecture", Sep. 2000.*

Gehrmann, C. et al. "Securing ad hoc services, a Jini view—extended abstract", 2000 IEEE.*

McGrath, Robert E. "Discovery and Its Discontents: Discovery Protocols for Ubiquitous Computing", Apr. 2000.*

Minsky, Naftaly H. et al. "Making Tuple Spaces Safe for Heterogeneous Distributed Systems", 2000 ACM.*

Jini organisiert das Netz selbst pp. 82-85.

Geitreiche Verbindungen.

Jini Architectural Overview Technical White Paper.

Stajano et al., "The Resurrecting Duckling: Security Issues for Ad-hoc Wireless Networks", Security Protocols, International Workshop Proceedings, Sep. 15, 1999, pp. 1-11.

Pemont, "Geistreiche Verbindungen Intelligente Gerdte In dezentralen Nietzen" CT Magazin fur Computer Technik, No. 20, 1998, pp. 196-202.

Edwards, "Core Jini", Jun. 1999, Prentice Hall pp. 68-76.

Czerwinski, et al. "Nan Architecture for a Secure Service Discovery Service", Proceedings of Mobicom 99 Aug. 15, 1999, pp. 24-35.

Kauser et al., "Sesame The Solution to Security for Open Distributed Systems", Computer Communications, 7 07 07, pp. 501-518.

Velzades et al., Service Location Protocol In RFC 2165 IETF 1997, pp. 17-19.

* cited by examiner

METHOD AND SYSTEM FOR THE SECURE USE OF A NETWORK SERVICE

BACKGROUND OF THE INVENTION

1. Field of the Invention

The present invention relates, generally, to a method and system for the secure use of a network service and, more particularly, to such a method and system using a blackboard on which all usable services are entered and, upon detection of a service which has not yet been entered on the blackboard, a check is made to determine whether use of this service is admissible and, if so, the service is entered under the blackboard.

2. Description of the Prior Art

The extension of networks is usually administered centrally today. If a new network element is added, it is necessary to ensure that it "gets on" with the network elements which are already available; that is, a syntactically and semantically correct interface to the network is stipulated and appropriate interface drivers, also called "stubs," are used. Stipulating such interfaces is usually time consuming and very susceptible to errors, particularly between systems from different manufacturers, because, for example, it is then usually possible to network together only interface drivers which are based on the same interface version.

One concept for a more flexible extension of networks is "Plug & Play (PnP)," where each network element specifies its interface using a specific interface description language, and services of the network element are accessed using interface drivers which are produced using the interface specification. An example of one application of the PnP concept is in "ad-hoc networks," in which network elements from different manufacturers respectively make their services available to those network elements which are currently integrated in the ad-hoc network; there being no prior stipulation as to which interface is possessed by the respective network elements. A brief description of this novel network type can be found in Claudia Piemont, "Geistreiche Verbindungen-Intelligente Geräte in dezentralen Netzen" [Smart connections-Intelligent devices in local area networks], c't, No 20, 1998. Products in the PnP field are currently being developed at Sun (Jini™), Hewlett Packard (JetSend), Lucent (Inferno) or Microsoft (uPnP=Universal Plug & Play[1]), for example.

The text below describes the Jini™ mechanisms from Sun by way of example. However, this constitutes no restriction for the inventive mechanisms, which can be used generally. The architecture and mechanisms of Jini™ are described in Sun Microsystems, "Jini™ Architectural Overview", Technical White Papers[2], January 1999. Ad-hoc networks, such as that of Jini™, are distinguished in that network elements, and hence also the services they provide, can be added to and removed from a network arbitrarily.

Services are understood as being an agency which can be used by a person, a program or another service. By way of example, they may be hardware, software, filters, a communication channel, memory space and much more. To deal with an overall object which is set, it may be necessary to use a large number of individual services. The services which are currently available and can thus be used in each case are registered on "blackboards," sometimes, also called "lookup functions."

The blackboards also control the addition and removal of services to and from the network at arbitrary times. Network elements are able to communicate, or "join" their existence and their services to a blackboard. A blackboard is also able to search for network elements providing services, also called "lookup" or "discovery." For use of the services, a leasing mechanism is provided. In this context, a period for use is agreed between the agencies involved, after the expiration of which the resources of the used service are released again. The use of services, and hence the communication which is necessary in this regard, is effected using Java Remote Method Invocation (RMI™), for example, the structure of which is comparable with the tried and tested Remote Procedure Calls (RPC).

The Jini security architecture is designed such that each service has an owner and is equipped with access control; i.e., the service has the identity of its owner. This owner generally also defines the system's use rights, at least for those services which it makes available to the system. If a first service now uses a second service, this use takes place with the identity of the second service. Whether access is permitted depends on the access control of the first service. In this regard, cf. also Richard Sietmann, "Jini organisiert das Netz selbst" [Jini organizes the network itself], Funkschau, No 23, page 84, section "Sicherheit bei Jini" [Jini security], 1 st paragraph, 1998. This concept requires local administration of use rights. In addition, a service for which no access control is provided is available to all the network elements in an ad-hoc network.

The present invention is thus directed to improving the secure use of a network service.

SUMMARY OF THE INVENTION

Accordingly, a fundamental aspect of the present invention is secure use of a service in a network, in particular an ad-hoc network, having a blackboard on which all the usable services are entered. Following detection of a service which has not yet been entered, a check is carried out to determine whether use of the service is admissible, and the service is entered onto the blackboard only if use of the service is admissible.

A few fundamental advantages of the present invention are:

The use rights can be administered centrally. This results in homogeneous and consistent management of use rights within the scope of action of a blackboard.

Services which cannot be used no longer appear on the blackboard. The blackboard therefore becomes clearer.

Access control is also provided for those services for which no individual access control is implemented. By way of example, this allows administration to the effect that a printer within a company does not appear on a blackboard which is also accessible to network elements outside the company.

In accordance with one embodiment of the inventive method, the blackboard stores use software which is loaded by a service user at least before he/she uses the service for the first time. Advantageously, the service user's loading of the use software, also called "interface driver," allows the installation of a service-specific interface driver for using the service to be dispensed with. The problems described initially are, thus, also eliminated.

In accordance with another embodiment of the inventive method, the use software has a format which is executed by a virtual machine. As such, the use software can be used on any network element on which a virtual machine version designed for the network element is installed. The use software thus becomes independent of the specific design of the respective network elements.

In accordance with a further embodiment of the inventive method, the use software is extended by at least one security function to form at least partially secure use software. Thus, even after the use software has been loaded by the service user, the use of the service in the service user's network element is advantageously protected independently of the blackboard.

In accordance with yet another embodiment of the inventive method, the extension is made if the check reveals that use of the service is admissible. The extension is then made only if it is required, which avoids unnecessary extensions. This increases the efficiency of the blackboard.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
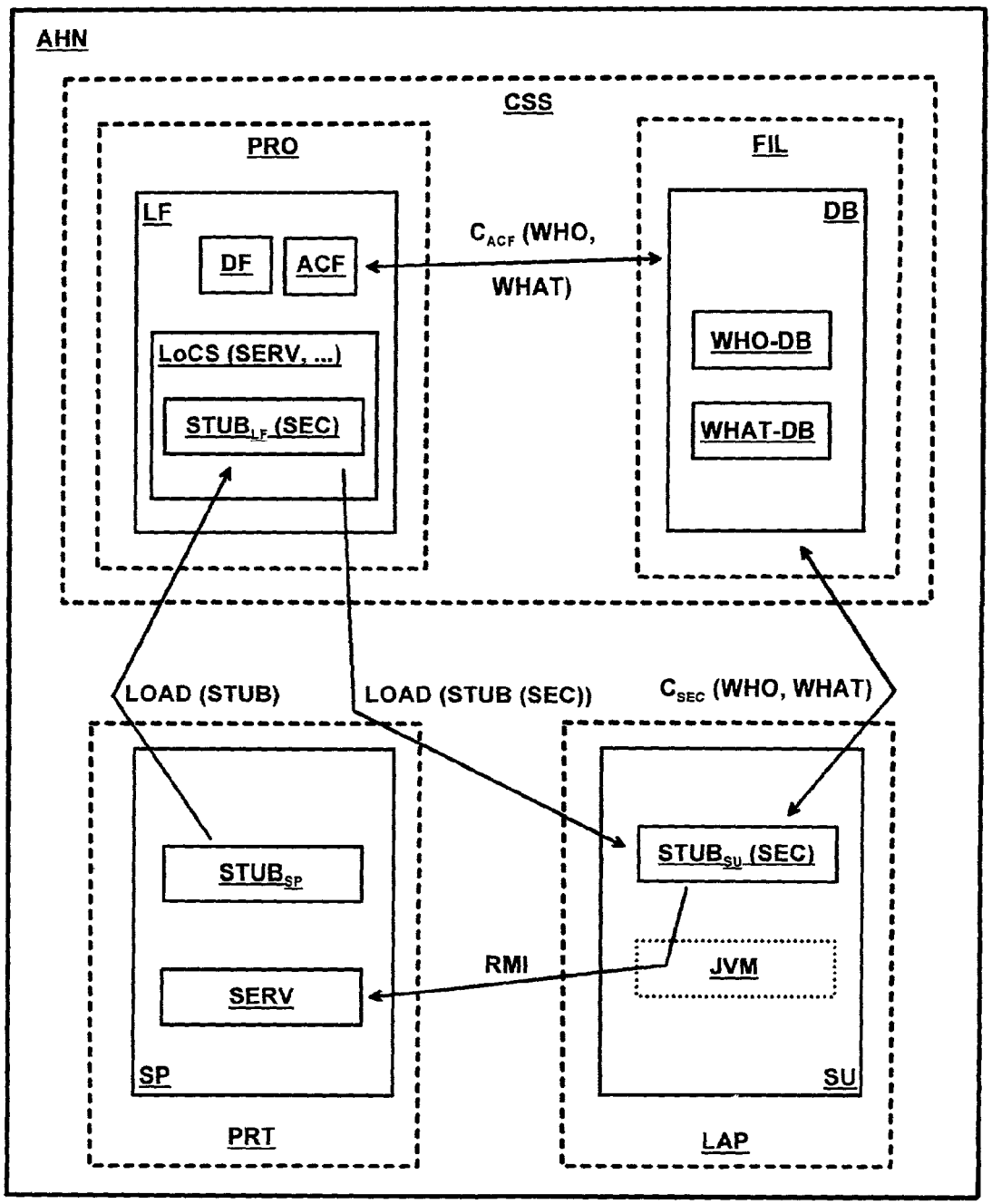
FIG. 1 shows a schematic diagram of a system to which the method of the present invention is directed.

The system of FIG. 1 includes:
a service provider SP with a service SERV which can be used in principle, and use software $STUB_{SP}$ for interface-compliant use RMI of the service SERV;
a blackboard LF with a discovery function DF for detecting services SERV which can be used in principle, an admissibility checking function ACF for checking the admissibility of a detected service SERV, and a list of admissible services LoCS in which the service SERV is registered and its use software $STUB_{LF}$, possibly complemented by a security function SEC, is stored;
a service user SU with a loaded agency for the complemented use software $STUB_{SU}$ (SEC) executed by a virtual machine JVM; and
a database DB storing an authentication database WHO-DB and an authorization database WHAT-DB.

To illustrate one possible system for carrying out the method of the present invention being embedded in a physical environment, FIG. 1 shows the service provider SP in the form of a printer PRT, the service user SU in the form of a laptop LAP, and the blackboard LF in the form of a process PRO running, by way of example, on a central security server ZSS in the ad-hoc network AHN. The database DB is integrated into the context of the process PRO, for example, by virtue of its being provided as a file FIL on the hard disk of the security server ZSS. The aforementioned physical devices, also called "network elements," form an ad-hoc network AHN.

For one exemplary embodiment of the present invention, it may be assumed that the service SERV is to be used by the service user SU. To this end, the service user SU is spontaneously connected to the service provider SP in the ad-hoc network AHN, in which at least the blackboard LF is additionally provided.

Initially, the blackboard LF is unaware of the service SERV, since, by way of example, the service provider has not yet been integrated into the ad-hoc network. When the service SERV has been integrated, it is detected by the discovery function DF. Subsequently, an inventive check $C_{ACF}$ is carried out by comparing the detected service SERV with checking data stored in the database DB. By way of example, the identity of the service provider SP, having an authentication WHO, is checked against the authentication database WHO-DB, and/or the authorization of the service provider, having an authorization WHAT, to register the service SERV on the blackboard is checked using the authorization database WHAT-DB. Provided that this check $C_{ACF}$ reveals that subsequent use RMI of the service SERV is admissible, the service SERV is entered into the list of admissible services LoCS.

In accordance with one embodiment of the present invention, the use interface STUB for the service SERV is additionally loaded using a loading operation LOAD and is stored on the blackboard LF; e.g., in the list of admissible services LoCS. If appropriate, the loaded use software STUB is at least partially extended by a security function SEC. Preferably, this extension is made only if the check $C_{ACF}$ reveals that use RMI of the service SERV is admissible.

The service SERV can be used RMI by the service user SU as soon as the service user SU has been integrated into the ad-hoc network. Subsequently, an inquiry with the blackboard LF can be used to detect that the service SERV can be used in this ad-hoc network. To this end, the service user SU loads the use software STUB stored on the blackboard LF. It is then run; e.g., using a virtual machine JVM which is already installed. This provides for use RMI of the service SERV by the service user SU.

In accordance with another embodiment of the present invention, in this context, the complemented security function SEC carries out another check $C_{SEC}$ on the authentication WHO and/or authorization WHAT of the service user SU; e.g., whenever the service SERV is used RMI. It is, thus, possible to ensure that there is no unauthorized use RMI; e.g., by interface calls copied or manipulated by unauthorized third parties.

Finally, the illustrative character of this physical arrangement will be emphasized. Any other desired distribution of the function over the physical system is possible. Thus, the blackboard LF could, by way of example, also be integrated into the printer PRT, could be provided on the laptop LAP or could be run in a mobile phone. The database DB could be integrated into a security database (e.g., user management in a network domain) also used for other security procedures. This largely arbitrary configuration of the system is shown in FIG. 1 by illustrating the physical devices in dashed lines.

In addition, it may be pointed out that the present invention is not limited to ad-hoc networks AHN but, rather, may be used in any desired communication network in which PnP concepts using blackboards LF are used. By way of example, use is envisaged in:
long distance communication networks, such as the Internet;
local communication networks, also called "local area networks" or "LANs";
virtual communication networks, such as a virtual private network "VPN".

Indeed, although the present invention has been described with reference to specific embodiments, those of skill in the art will recognize that changes may be made thereto without departing from the spirit and scope of the invention as set forth in the hereafter appended claims.

We claim as our invention:
1. A method for the secure use of a network service using a blackboard on which all usable services are entered, the method comprising the steps of:
detecting a service which has not yet been entered on the blackboard;

executing a first check to determine whether use of the service is allowed;

entering the service in the blackboard only if it is determined that use of the service is allowed;

loading an interface driver related to the service on the blackboard;

extending the loaded interface driver on the blackboard with at least one security function to form a secured interface driver;

loading the secured interface driver related to the service prior to the first use of the service; and executing a second check by a second security function prior to the use of the service to determine if use of the service is allowed by a user.

2. A method for the secure use of a network service as claimed in claim 1, wherein the service is detected by a discovery function.

3. A method for the secure use of a network service as claimed in claim 1, wherein the step of executing the first check includes at least one of authentication and/or authorization of a service provider providing the service.

4. A method for the secure use of a network service as claimed in claim 3, wherein the step of executing the second check includes at least one of authentication and/or authorization of a user.

5. A method for the secure use of a network service as claimed in claim 1, wherein the first and second checks include a comparison with check data stored in a common database.

6. A method for the secure use of a network service as claimed in claim 1, wherein the interface driver is executable by a virtual machine.

7. A system for the secure use of a network service, comprising:

a communications network;

a blackboard connected to the communications network on which all usable services are entered;

a processing part for detecting a service which has not yet been entered on the blackboard;

a processing part for executing a first check to determine whether use of the service is allowed;

a processing part for entering the service in the blackboard only if it is determined that use of the service is allowed;

an interface for loading an interface driver related to the service on the blackboard;

a processing part for extending the loaded interface driver on the blackboard with at least one security function to form a secured interface driver and loading the secured interface driver related to the service prior to the first use of the service via said interface; and a processing part for executing a second check by a second security function prior to the use of the service to determine if use of the service is allowed by a user.

* * * * *